(No Model.)

E. ARNSTEIN.
ENAMELING OVEN.

No. 565,660. Patented Aug. 11, 1896.

Witnesses.

Inventor.
Eugene Arnstein
by Walter H. Chamberlin
Atty.

UNITED STATES PATENT OFFICE.

EUGENE ARNSTEIN, OF CHICAGO, ILLINOIS.

ENAMELING-OVEN.

SPECIFICATION forming part of Letters Patent No. 565,660, dated August 11, 1896.

Application filed November 25, 1895. Serial No. 569,975. (No model.)

*To all whom it may concern:*

Be it known that I, EUGENE ARNSTEIN, a citizen of the United States, residing at Chicago, county of Cook, State of Illinois, have invented a certain new and useful Improvement in Enameling-Ovens; and I declare the following to be a full, clear, and exact description of the invention, such as will enable others skilled in the art to which it pertains to make and use the same, reference being had to the accompanying drawings, which form a part of this specification.

My invention has for its object the production of a baking-oven adapted more particularly for use in connection with the enameling of bicycle-frames.

It consists of a combination of devices and appliances hereinafter described and claimed.

Figure 1:
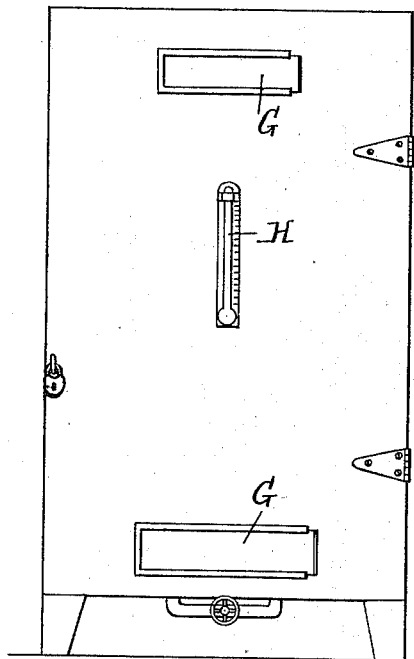
Figure 2:
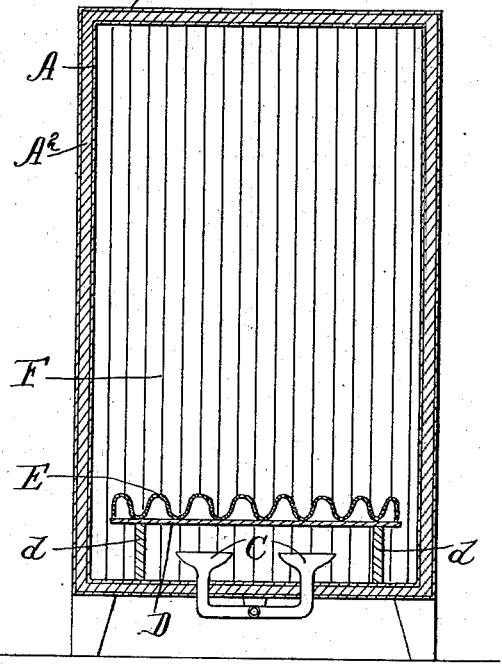
Figure 3:
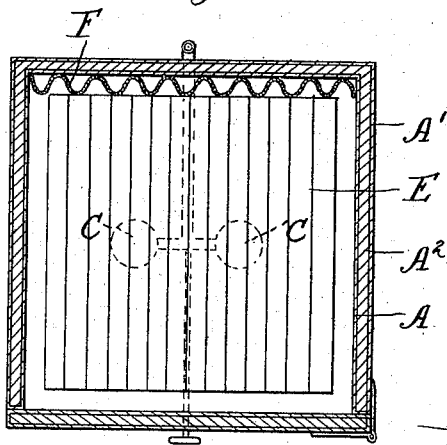

In the drawings, Figure 1 is a front elevation of an oven embodying my invention. Fig. 2 is a vertical section of the same. Fig. 3 is a horizontal section.

In carrying out the invention A A' represent, respectively, the inner and outer walls of the oven, with a non-conductor filler $A^2$ between. Inasmuch as the heat never gets high in the oven, I make this filler of wood, which at once forms a stiffener for the frame or walls and at the same time forms a heat non-conductor or insulator.

C represents the burners—either gas, gasolene, or other fuel—for heating the oven. Above them is a spreader D, supported from the bottom by the legs $d$. Resting on the spreader D is a corrugated plate E, and against the back of the oven is another corrugated plate F, the two forming racks on and against which the bicycle-frames to be baked can be placed. These corrugated plates enable a large number of frames to be placed in the oven, keeping each away from the other and yet allowing a free circulation of heat in the oven. This form of rack further allows the frames, if there be only a few in the oven, to be tilted, as is often desired when the frames are first put into the oven.

G represents ventilating-slides, and H a thermometer.

What I claim is—

An enameling-oven for bicycle-frames consisting of a metal oven having an inner and outer wall with a filler of wood between, one or more burners for heating the oven, a spreader above the burners, a corrugated plate on the spreader and another corrugated plate placed in an upright position against the back of the oven, substantially as described.

In testimony whereof I sign this specification in the presence of two witnesses.

EUGENE ARNSTEIN.

Witnesses:
 NELLIE HANLEY,
 DE WITT W. CHAMBERLIN.